Feb. 21, 1933.  F. W. BIRTCH  1,898,419
THERMOSTATICALLY CONTROLLED HEATER
Filed March 4, 1932
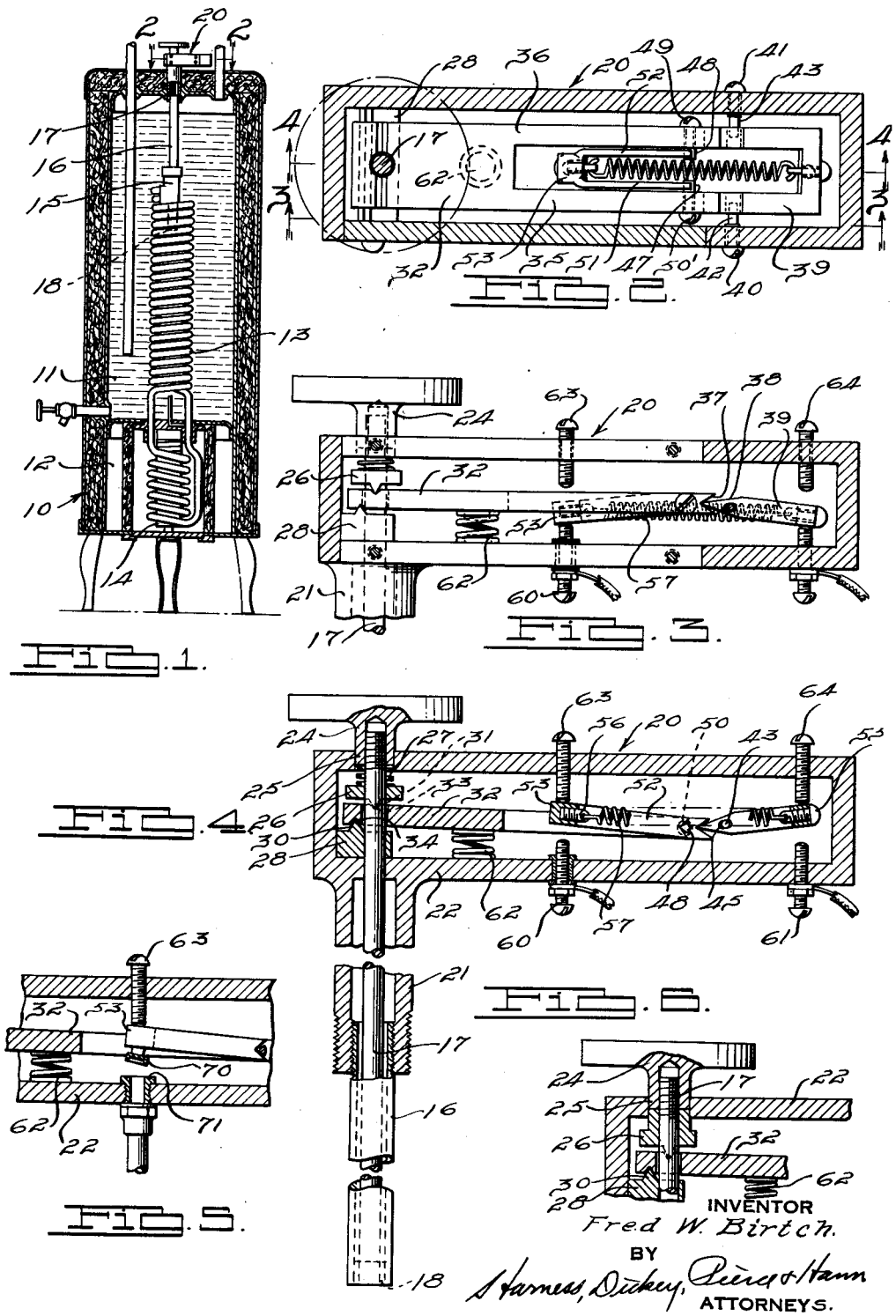
INVENTOR
Fred W. Birtch.
BY
ATTORNEYS.

Patented Feb. 21, 1933

1,898,419

UNITED STATES PATENT OFFICE

FRED W. BIRTCH, OF LEXINGTON, MICHIGAN, ASSIGNOR OF ONE-HALF TO HARRY A. SHAW

THERMOSTATICALLY CONTROLLED HEATER

Application filed March 4, 1932. Serial No. 596,708.

The invention relates to thermostatically controlled heating devices and it has particular relation to a thermostatically controlled heating device for hot water tanks.

Thermostatic controlling of heater units for hot water tanks and the like involves many difficulties. If an electrical unit is employed, the thermostat should cause closing and opening of an electrical switch controlling the heating unit circuit, without arcing of the electrical current, as such arcing always interferes with uniform operation of the heater, necessitates measures to compensate for deterioration of contact points, and shortens the life of the switch. Moreover, the controlling of this switch should be effected with minimum or no effect on the thermostat, as any interference of this character tends to vary the operation of the latter.

In the fuel burning heater unit, the thermostat must control operation of a valve, and frequently moving this valve prevents operation of the thermostat in the desired manner. Moreover it is important that the valve open and close quickly to avoid drag in operating conditions, and prevent overheating or overcooling of the water.

In either case, it is very desirable that the thermostat operate with minimum or no interference, even though it controls an electric switch, or a fuel valve. Also it is important that the switch be closed or opened rapidly and with great power to avoid arcing of current, and to insure operation of the switch at the proper times without drag in operating conditions. In the case of the fuel valve, it is equally important that the valve close and open at the proper times, likewise with power and rapidity to avoid drag in the control of the heater.

One object of this invention is to provide a thermostatically controlled switch, which is opened and closed rapidly and powerfully to avoid arcing of electrical current or drag in operating conditions, and to insure uniform, accurate and dependable operation of the thermostatic control.

Another object of the invention is to provide a thermostatically controlled switch of the above mentioned type, in which such operation of the switch is effected without noticeably interfering with the normal and desired operation of the thermostat, and without undesirable loading of the latter, or undesirable stressing of any parts that might affect operation of the thermostat.

Another object of the invention is to provide a thermostatically controlled electric switch, in which movement of the thermostatic movable element is highly compounded in a simple manner, with few parts, and without loading of the thermostat in an appreciable manner.

Another object of the invention is to provide a thermostatically controlled fuel valve which is opened and closed rapidly and powerfully, without drag in its movement, and without appreciable loading of the thermostat.

And in general, it is an object of the invention to provide a thermostatically controlled heater for hot water tanks and the like, which is very simple in construction, very durable, positive and non-varying in its action, and in general which will insure heating of the water through any given range of temperatures, in a constantly uniform, accurate, and dependable manner.

Other objects of the invention will be apparent from the following description taken in conjunction with the drawing, and from the claims hereinafter set forth.

For a better understanding of the invention reference may be had to the accompanying drawing forming a part of the specification, wherein:

Figure 1 is a vertical cross-sectional view of a hot water heater in which one embodiment of the invention is incorporated;

Fig. 2 is a cross-sectional view, on a larger scale, taken substantially along the line 2—2 of Fig. 1, and illustrating the thermostatically controlled switch;

Fig. 3 is a cross-sectional view taken substantially along the line 3—3 of Fig. 2, and illustrating the switch in closed position;

Fig. 4 is a cross-sectional view taken substantially along the line 4—4 of Fig. 2 and illustrating the switch in circuit breaking position;

Fig. 5 is a fragmentary cross-sectional view illustrating how the arrangement shown by Fig. 2 may be employed for controlling a fuel supply valve instead of an electrical circuit.

Fig. 6 is a fragmentary cross sectional view illustrating a slightly different type of thermostatic coupling for the switch or valve.

Referring to Fig. 1, a hot water tank is indicated at 10 and in the particular type illustrated, an upper compartment 11 is provided for the water and a lower compartment 12 for a heating unit. For heating the water in the compartment 11 a water coil 13 is provided which extends into the lower compartment 12 and surrounds an electrical heating unit 14. When the heating unit is energized the heat is transferred to the water in the coil 13 and circulation of the water in the latter results in a transfer of heat to the water in the upper compartment. The present invention has particular relation to a thermostatically controlled switch for governing an electric circuit including the heating unit so that the water in the upper compartment 11 may be heated in a predetermined manner.

As shown, the upper end of the coil 13 has a tubular support 15 for guidingly supporting a copper tube 16 which extends through the upper end of the tank. An invar rod 17 is disposed within the copper tube 16 and is connected to the lower end of the latter as indicated at 18. Accordingly, it will be evident that the copper tube and invar rod both are located in the water in the upper compartment and since the copper has a much higher coefficient of expansion than that of the invar rod, expansion or contraction of the copper tube will be relatively greater than that of the invar rod for any variation in temperature of the water in the tank. This variation in movement between the copper tube and invar rod when subjected to varying temperatures, is employed to control the electrical switch which in turn controls the heating unit 14.

Now, as particularly shown by Figs. 3 and 4, it will be noted that the copper tube 16 is threaded into an offset tubular portion 21 of a switch housing indicated at 22, and such tubular portion is threaded at its free end so that it may be threaded into the upper end wall of the hot water tank and hence maintained rigidly in position. From this it will be evident that the free end of the copper tube disposed in the hot water in the tank, may move inwardly or outwardly as its temperature increases or decreases respectively, and that the switch housing and the end of the copper tube connected thereto will be maintained rigidly in position as a result of the connection between the housing and the tank. Inasmuch as the copper tube will expand and contract more than the invar rod 17, movement of the latter at that end opposite its connection with the copper tube, is employed for controlling the electric switch. The manner in which this is accomplished will now be described.

The invar rod extends through the housing 22 in slidable relation therewith, and on the opposite side of the housing is threaded into a manually controlled disc 24, which has a tubular portion 25 closely fitting but slidable in an opening in the housing wall so that movement of the end of the rod will be positively and accurately guided through the housing. Inwardly of the disc 24, a block 26 is slidably mounted on the rod and between the block and the end of the disc portion 25, a strong spring 27 may be provided, which is of such strength that in normal operation of the switch, or full control, pull on the invar rod will compress it little, if any. Inwardly of the block 26, a second block 28 seats on the opposite housing wall and the invar rod likewise slidably projects through this block. The spring 27 in one capacity may constitute a safety feature to prevent possible breakage in the event the temperature continued to rise for any reason whatever. This spring especially seems desirable in the larger types of switches and fuel controls.

The upper surface of the block 28 is provided with a V-shaped projection 30 and the lower surface of the block 26 is similarly provided with a V-shaped projection 31, the latter projection being substantially in alignment with the axis of the invar rod 17 while the projection 30 is disposed slightly to one side and between this axis and the end of the housing wall adjacent the rod. Between the blocks 26 and 28, the rod loosely passes through an arm 32 which has a V-shape notch 33 adapted to receive the projection 31, and a V-shape notch 34 adapted to receive the projection 30. It should be understood that the notches are of sufficient angular dimensions that fulcruming movement of the arm 32 will be permitted although of course the sharp edges of the projections will seat in the apices of the notches.

The arm 32 extends longitudinally in the housing 22 and as shown best by Fig. 2, has its free end bifurcated to provide legs 35 and 36. Each of the legs 35 and 36, as best shown by Fig. 3, has a notch 37 formed in its end face which is of V shape, and such notches on both legs receive V shaped ends 38 of a U shaped arm 39 disposed between the end of arm 32 and that end of the housing remote with respect to the invar rod connection. The angle between the sides of the V shaped ends of the member 39 is smaller than the angle between sides refining the notches 37 so that the member 39 may fulcrum in such notches between limits defined by the difference between such angles, although it is apparent that the edges of the ends 38 will fulcrum in the apices of the notches.

Screws 40 and 41 threaded through opposite sides of the housing 22 and having trunnion portions 42 and 43 on their inner ends, are provided to guide and position the member 39, and such trunnions project respectively into elongated openings 45 formed in the legs of the member 39 adjacent the V shaped ends thereof. The width of these slots closely corresponds to the diameter of the trunnion portions but the slots are longer than such diameter to permit, if necessary, such as when any wear occurs, some movement of the member 39 longitudinally of the arm 32 and with respect to the trunnions.

Adjacent the notches 37, the legs 35 and 36 of the arm 32 are provided with inwardly directed projections 47 and 48 which in this instance constitute inner end portions of screws 49 and 50'. The inner ends of the screws, or the projections, are V shaped as shown in Fig. 4, with the apex of the V portions directed away from the notches 37. Such V shaped projections extend into notches 50 formed in the end faces of legs 51 and 52 of a second U shaped member 53 disposed between the legs 35 and 36 of the arm 32. It, of course, should be understood that the notches 50 have side walls directed at an angle to each other which is greater than the angle of the V shaped projections 47 and 48 so that the member 53 may fulcrum within limits on such projections, and that the apices of the projection seat in the apices of the notches. The base portions of the U-shaped members 39 and 53, respectively have screw connections 55 and 56, to which opposite ends of a spring 57 are connected. This spring is of extremely strong character and it will be evident in view of the provision of elongated slots 45 for receiving the trunnions 42 and 43, that the spring will maintain the member 39 seated in the notches 37 without interference as a result of the trunnions engaging the end of the openings 45, and that the member 53 likewise will be maintained strongly fulcrumed on the projections 47 and 48. Accordingly, the spring exerts its force through the members 39 and 53 against the bases of the notches 37, and against the projections 47 and 48, and with no effect on moving the arm 32 lengthwise of the housing.

The lower wall of the housing as shown in Fig. 4, is provided with an insulated contact screw 60 which extends through the wall into a position where it may be engaged by the base portion of the U-shaped member 53. A second contact 61 is threaded through the same wall of the housing in a position where it may be engaged by the base of the U-shaped member 39, and these contacts are connected in suitable electrical circuits to the heater unit 14 so that when the contacts are bridged by a conductor, the heater unit will be energized and when the contacts are separated from the conductor, the heater unit will not be energized. The U-members 39 and 53 together and in conjunction with the arm 32 may constitute this conductor and when they engage the contacts 60 and 61 it is apparent that the heater unit will be energized.

Also as shown by Fig. 4 a relatively strong spring 62 is disposed between the lower side of the arm 32 and the housing wall and in such position that it urges the arm 32 upwardly. Screws or suitable adjusting members 63 and 64 also are threaded through the opposite wall of the housing for engagement respectively with the opposite sides of the base portions of U members 53 and 39. These screws as shown are substantially aligned with the contact screws 60 and 61.

In operation of the heater unit and thermostatically controlled switch, attention is first directed to Fig. 3 which shows the U members 39 and 53 engaging the contact screws 61 and 60 respectively, and hence the unit 14 is energized. As the water in the tank becomes warmer, it is apparent that the copper tube 16 will elongate and hence pull the invar rod 17 further into the tank. As this occurs, it is apparent that the block 26 will be moved toward the arm 32 and hence that the V projection 31 will be urged against the apex of notch 33 in the arm. As the projection 30 is seated in the notch 34, this movement of the invar rod and block 26 will cause the arm 32 to fulcrum about the projection 34 and hence the free end of the arm to move toward the lower housing wall, against the action of spring 62. As the free end of the arm 32 moves downwardly, the U member 39 will fulcrum about the trunnions 42 and 43 although slight longitudinal movement of the member may occur as a result of the arcuate movement of the arm. As the member 39 so fulcrums, it is apparent that, the end of the spring connected thereto will be moved upwardly and when this movement is sufficient, to substantially align the spring 57 with the projections 47 and 48, the spring moving past the dead center or neutral position, will cause the arm 53 to leave contact 60 and move into engagement with screw 63. Owing to the strength of the spring 57, and the fact that it is under considerable tension, this movement of arm 53 is instantaneous and actual tests show that there is no drag in its movement away from the contact. Such tests show also that arcing of electrical current as the arm leaves the contact, is eliminated. Simultaneously, or substantially so, with the movement of arm 53, the spring 57, causes the arm 39 to move against the screw 64.

At this time it is desired to call attention to the manner in which the movement of the invar rod is compounded in operating the switch. Ordinarily the range of temperature change will only be such as to cause a movement of the invar rod a very small distance, as for example one thousandth of an inch. This movement is magnified at the free end of arm 32, for example 30 times. In turn, any movement of the free end of arm 32 causes a movement of the base portion of U member 39, which may be magnified, for example, 5 times. It follows that any movement of the invar rod is compounded, for example, 150 times in a movement of the base portion of arm 39.

When the circuit is so broken, the water may then begin to cool, and as it cools, the invar rod moves outwardly, and the spring 62 consequently moves the arm 32 upwardly, from the position shown in Fig. 3. As this movement continues, spring 57 will finally be brought into action to throw the arms 39 and 53 reversely, and the electric circuit will again be completed.

It has been stated that arm 39 is moved quickly to screw 64 by spring 57, when the arm 32 in moving downwardly reaches the centerline position, and conversely, the arm 39 is moved quickly to screw 61 by spring 57, when the arm 32 in moving upwardly reaches the centerline position. Seemingly, when the arm 32 has so moved downwardly, and arm 39 moves toward screw 64, the spring 57 acting through arm 39 tends to fulcrum the latter about the trunnions 42 and 43, and hence to move arm 32 against the action of spring 62. It appears that this force of spring 57, coacting with the tensioned condition of the invar rod spring 27 and compressed condition of the copper tube, which parts naturally act to relieve their tensioned and compressed condition, is sufficient to overcome spring 62 sufficiently to permit such movement of arm 32 still further and arm 39 to screw 64. While this appears to be a reason why arm 32 moves to allow arm 39 to move to screw 64, possibly other conditions may be more or less responsible, as for example, the infinitesimal character of movement of the arm 32 at the invar rod end, or possibly a slight resiliency or give in the parts, or a slight permissibility of play. Conversely, when the invar rod moves up, as the temperature decreases, and the arm 32 moves past the centerline sufficiently to permit arm 39 to engage screw 61, the movement of arm 32 may be permitted and caused as a result of spring 57, in combination with spring 62, overcoming spring 27. At any rate, arm 39 quickly and rapidly moves to its extreme positions when the thermostat has moved or allowed arm 32 to move to the centerline position.

Adjustment of the disc 24 permits a variation in the high and low temperature of any given range. To vary the range, the positions of screws 61 and 64 or one of them may be varied, and it is evident that if the inner ends of the screws are spaced farther, the base of arm 39 moves through a greater distance. The nearer the inner end of either screw is to the casing wall, the more arm 32 will have to move to cause arm 39 in leaving such screw to bring the spring to its neutral line position and hence to operate the switch. While the neutral position is mentioned, actual use of the device shows that it is impossible to dead center the spring as it will always move past such so called neutral line. The more screws 60 and 64 are spaced, the greater the range of temperature and vice versa. Also, the range of temperature might be varied by adjusting screws 60 and 63 or one of them. Preferably however it is desired to adjust screws 60 and 63, or at least screw 60, according to voltage of the electric current used, or in other words if a higher voltage is employed, such screws will be spaced a greater distance, and particularly screw 60 will be threaded further out of the casing. In the event a different voltage is utilized, and it is desired to maintain the same temperature range, the variation in spacing of screws 60 and 63, may be compensated for, by a reverse variation in spacing of screws 61 and 64, or one of them as the case requires.

As shown by Fig. 5, the arrangement previously described may be employed to control a fuel valve such as a valve for controlling the flow of gas to a gas burner. In this construction, instead of using a screw contact 60, a valve 70 may be connected to the base of the U-member 53 and a valve seat 71 provided in the wall of the housing. Of course in this type of construction the housing will be sealed against the escape of fuel except through the valve and an opening will be provided for the flow of the fuel either into the housing or out of it to supply fuel either to the burner or to the housing depending upon whether or not the valve is connected directly to the burner or merely supplies fuel to the housing and the latter in turn supplies fuel to the burner. It will be appreciated, of course, that the valve will close and open powerfully and quickly to entirely eliminate "drag", and operate substantially in the same way as the arm 53.

The construction shown by Fig. 6, is similar to those previously described except that the spring 27 is eliminated. It may be stated here that while the spring 27 is preferably used, especially for large types of controls and as a safety feature, and that the spring may be of assistance in permitting arm 39 to move to its extreme positions, engaging the screws 61 and 64, a quick and powerful movement of such arm is obtained even in its absence. Actual use of devices of this character without spring 27, shows that the arm 32 so moves, and in a very rapid manner.

Although but one specific embodiment of this invention has been herein shown and described, it will be understood that numerous details of the construction shown may be altered or omitted without departing from the spirit of this invention as defined by the following claims.

I claim:

1. A thermostatic control for heat exchange units; comprising a support, an arm fulcrumed on the support, a heat exchange unit control member fulcrumed on the arm, a tensioned spring operatively connected to the arm and control member and means including a thermostat for fulcruming the arm, said spring being free of any connection with the support.

2. A thermostatic control for heat exchange units, comprising a support, an arm fulcrumed on the support, means including a thermostat for fulcruming the arm, a heat exchange unit control member movably connected to the arm, and a tensioned spring connected at one end to the control member, and at its other end operatively to the arm, so that the spring is bodily carried by the arm as an entity.

3. A thermostatic control for heat exchange units comprising a support, an arm fulcrumed on the support, means including a thermostat for moving the arm about its fulcrum, a heat exchange unit control member fulcrumed on the arm, and a tensioned spring bodily carried by the arm as an entity and connected at opposite ends to the free end of the control member and operatively to the arm.

4. A thermostatic control for heat exchange units comprising a support, an arm fulcrumed on the support, means including a thermostat for moving the arm about its fulcrum, a heat exchange unit control member fulcrumed on the arm, and a tensioned spring bodily carried by the arm as an entity and connected at opposite ends to the free end of the control member and operatively to the arm at a point spaced from the fulcrum of the control member.

5. A thermostatic control for heat exchange units comprising a support, an arm fulcrumed on the support, means including a thermostat for moving the arm about its fulcrum, a pair of members fulcrumed at spaced points on the arm, and a spring connecting the free end portions of such members from which it follows that the spring is carried as an entity by the arm and its potential force is exerted through such members against their fulcrums.

6. A thermostatic control for heat exchange units comprising a support, an arm fulcrumed on the support, means including a thermostat for moving the arm about its fulcrum, a pair of members fulcrumed respectively at spaced points on the free end of the arm, a tensioned spring connecting the free ends of the members, and means for fulcruming one of such members on the support.

7. A thermostatic control for heat exchange units comprising a support, an arm fulcrumed on the support, means including a thermostat for moving an arm about its fulcrum, a pair of members fulcrumed respectively at spaced points on the free end of the arm, a tensioned spring connecting the free ends of the members, and means for fulcruming one of such members on the support, said last mentioned means being such as to allow the spring to seat such one member on its fulcrum on the arm.

8. A thermostatic control for heat exchange units comprising a support, an arm fulcrumed on the support, means including a thermostat for moving the arm about its fulcrum, a pair of members fulcrumed respectively at spaced points on the free end of the arm, a tensioned spring connecting the free ends of the members, and means for fulcruming one of such members on the support, said last mentioned means being such as to allow the member to move longitudinally of the arm.

9. A thermostatic control for heat exchange units comprising a support, an arm fulcrumed on the support, means including a thermostat for moving the arm about its fulcrum, a heat exchange unit control member fulcrumed on the free end of the arm, and means including a tensioned spring for moving the member in opposite directions when the arm moves in opposite directions, without the application of force to move the arm in the direction of its length.

10. A thermostatic control for heat exchange units comprising a support, an arm fulcrumed on the support, means including a thermostat for moving the arm about its fulcrum, a heat exchange unit control member fulcrumed on the free end of the arm, means including a tensioned spring for moving the member in opposite directions when the arm moves in opposite directions, without the application of force to move the arm in the direction of its length, and means on the support for limiting said movement of the control member.

11. A thermostatic control for heat exchange units comprising a support, an arm fulcrumed on the support, means including a thermostat for moving the latter about its fulcrum, a heat exchange control member fulcrumed on the arm, and a tensioned spring operatively connected to the free end of the control member and to the arm, for governing operation of the control member upon movement of said arm, said parts being so related that the spring force does not act to move said arm longitudinally thereof and against its fulcrum.

12. A thermostatic control for heat exchange comprising a support, an arm fulcrumed on the support, means including a thermostat for moving the arm about its fulcrum, a member extending beyond the free end of the latter, a member fulcrumed on end of the latter, a member fulcrummed on the arm between the first fulcrums and extending from its fulcrum toward the first fulcrum, a tensioned spring connecting remotely disposed ends of the members, and means on the support for limiting throw of one of the members to either side of the arm, when the arm so moves that the spring passes the fulcrum of said member.

13. A thermostatic control for heat exchange comprising a support, an arm fulcrumed on the support, means including a thermostat for moving the arm about its fulcrum, a member extending beyond the free end of the arm, and being fulcrumed on the end of the latter, a member fulcrumed on the arm between the first fulcrums and extending from its fulcrum toward the first fulcrum, a tensioned spring connecting remotely disposed ends of the members, and means on the support for limiting throw of one of the members to either side of the arm, when the arm so moves that the spring passes the fulcrum of said member, said last means being adjustable.

14. A thermostatic control for heat exchange comprising a support, an arm fulcrumed on the support, means including a thermostat for moving the arm about its fulcrum, a member extending beyond the free end of the arm, and being fulcrumed on the end of the latter, a member fulcrumed on the arm between the first fulcrums and extending from its fulcrum toward the first fulcrum, a tensioned spring connecting remotely disposed ends of the members, and means on the support for limiting throw of one of the members to either side of the arm, when the arm so moves that the spring passes the fulcrum of said member, said limiting means comprising a heat exchange unit control element.

15. A thermotsatic control for heat exchange comprising a support, an arm fulcrumed on the support, means including a thermostat for moving the arm about its fulcrum, a member extending beyond the free end of the arm, and being fulcrumed on the end of the latter, a member fulcrumed on the arm between the first fulcrums and extending from its fulcrum toward the first fulcrum, a tensioned spring connecting remotely disposed ends of the members, means on the support for limiting throw of one member when the arm so moves in either direction that the spring passes the fulcrum thereof, and means on the support for similarly limiting throw of the other member when the spring passes its fulcrum.

16. A thermostatic control for heat exchange comprising a support, an arm fulcrumed on the support, means including a thermostat for moving the arm about its fulcrum, a member extending beyond the free end of the arm, and being fulcrumed on the end of the latter, a member fulcrumed on the arm between the first fulcrums and extending from its fulcrum toward the first fulcrum, a tensioned spring connecting remotely disposed ends of the members, means on the support for limiting throw of one member when the arm so moves in either direction that the spring passes the fulcrum thereof, and means on the support for similarly limiting throw of the other member when the spring passes its fulcrum, one of said means being adjustable to vary the range of temperature control, by varying the distance the arm must move to move the spring past the fulcrum of one of the members.

17. A thermostatic control for heat exchange comprising a support, an arm fulcrumed on the support, means including a thermostat for moving the arm about its fulcrum, a member extending beyond the free end of the arm, and being fulcrumed on the end of the latter, a member fulcrumed on the arm between the first fulcrums and extending from its fulcrum toward the first fulcrum, a tensioned spring connecting remotely disposed ends of the members, means on the support for limiting throw of one member when the arm so moves in either direction that the spring passes the fulcrum thereof, and means on the support for similarly limiting throw of the other member when the spring passes its fulcrum, one of said means including an electric contact point, for controlling an electric heat exchange unit.

18. A thermostatic control for heat exchange comprising a support, an arm fulcrumed on the support, means including a thermostat for moving the arm about its fulcrum, a member extending beyond the free end of the arm, and being fulcrumed on the end of the latter, a member fulcrumed on the arm between the first fulcrums and extending from its fulcrum toward the first fulcrum, a tensioned spring connecting remotely disposed ends of the members, means on the support for limiting throw of one member when the arm so moves in either direction that the spring passes the fulcrum thereof, and means on the support for similarly limiting throw of the other member when the spring passes its fulcrum, one of said means being adjustable to vary the range of temperature control, by varying the distance the arm must move to move the spring past the fulcrum of one of the members, and one of the means including an electric contact point for controlling an electric heat exchange unit.

19. A thermostatic control for heat exchange comprising a support, an arm fulcrumed on the support, means including a thermostat, engaging the arm close to its fulcrum, a member extending beyond the free end of the arm and fulcrumed on the latter, means pivotally mounting the member on the support adjacent its fulcrum on the end of the arm, whereby a small movement of the thermostat means highly compounds the movement of that end of the member remote with respect to its fulcrum, a second member fulcrumed on the arm between the fulcrums mentioned and extending toward the first fulcrum, a tensioned spring connecting the remotely disposed ends of the members, and means on the support for adjustably limiting the throw of one of the members, as the spring passes its fulcrum point.

20. A thermostatic control for heat exchange units comprising a support, arm having a bifurcated end portion, means for fulcruming the other end of the arm on a substantially stationary fulcrum on the support, a U member disposed generally beyond the bifurcated end of the arm, with the base of the member outermost, means for fulcruming the legs of said member on the legs of the bifurcated arm portion, a second U member disposed between the legs of such bifurcated arm portion with the base thereof innermost, so that the open ends of the U members are adjacent, means for fulcruming the legs of said second member on the legs of the bifurcated arm, but at a point spaced slightly from the fulcrum of the first U member, a tensioned spring connecting the bases of the U members, means for limiting fulcruming movement of the U members by such spring as the latter crosses one or both U member fulcrums, and means including a thermostat for controlling fulcruming of the bifurcated arm on its support.

21. An electrical control, comprising a support, an arm fulcrumed on the support, means for moving the arm about its fulcrum, an electric circuit control member fulcrumed on the arm, and a tensioned spring bodily carried by the arm as an entity and connected at opposite ends to the free end of the control member and operatively to the arm at a point spaced from the fulcrum of the control member.

22. An electrical control comprising a support, an arm fulcrumed on the support, means for moving the arm about its fulcrum, a pair of members fulcrumed respectively at adjacent points on the free end of the arm, a tensioned spring connecting the free ends of the members, means for fulcruming one of said members on the support, and an electrical contact on the support adapted to engage one of said members.

FRED W. BIRTCH.